No. 616,017. Patented Dec. 13, 1898.
J. A. ROST.
LINK VALVE GEAR.
(Application filed Jan. 26, 1898.)
(No Model.)
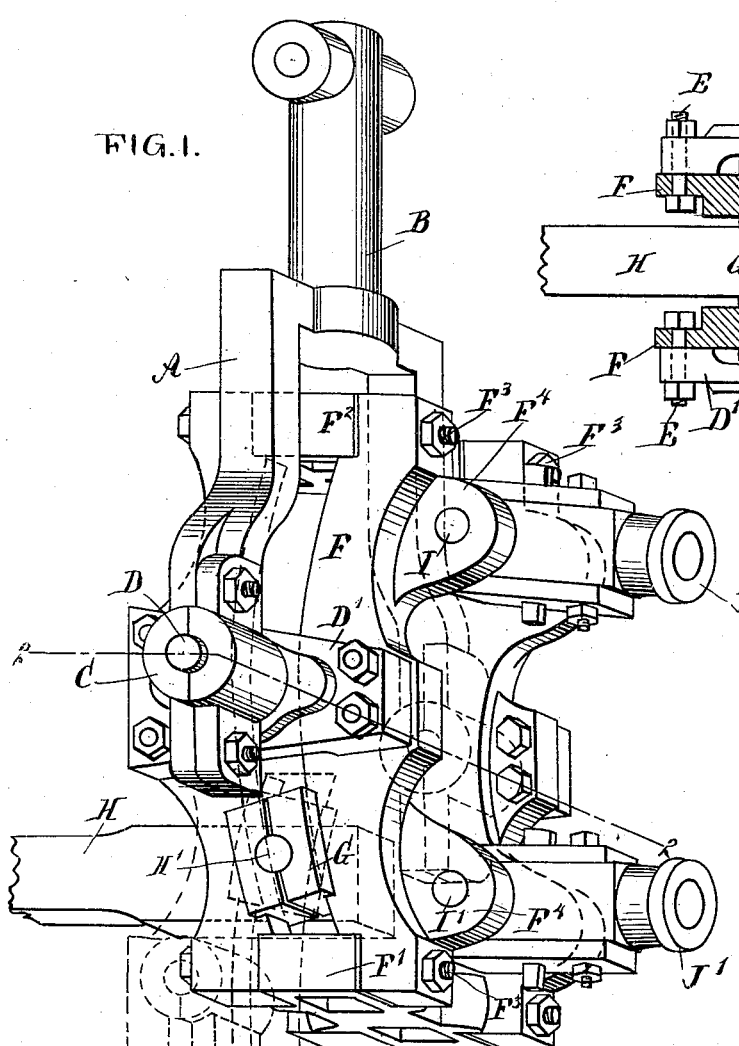
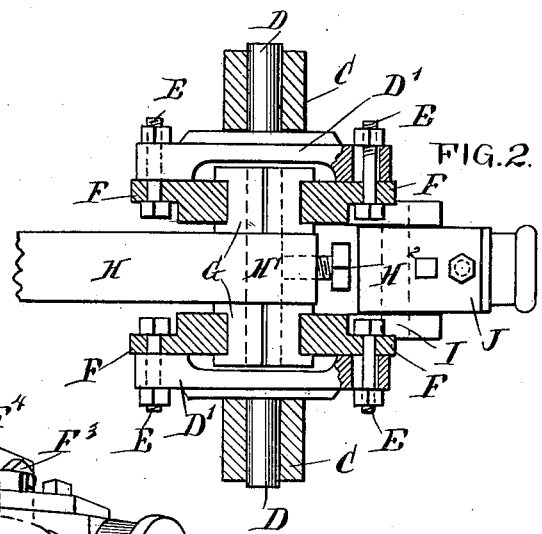
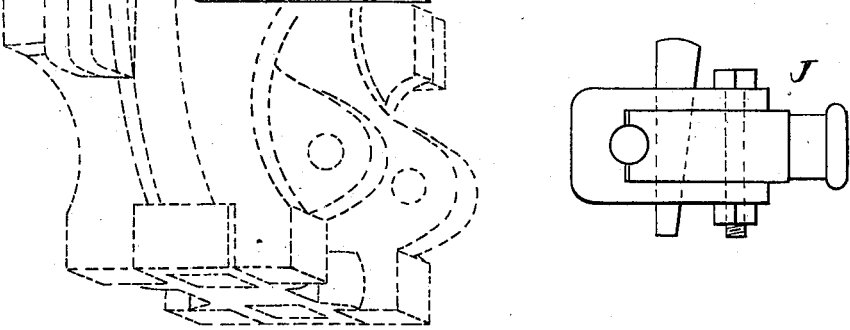
WITNESSES:
INVENTOR
J. A. Rost.
BY
ATTORNEYS.

UNITED STATES PATENT OFFICE.

JOHN A. ROST, OF AXTELL, NEBRASKA.

LINK VALVE-GEAR.

SPECIFICATION forming part of Letters Patent No. 616,017, dated December 13, 1898.

Application filed January 26, 1898. Serial No. 668,009. (No model.)

*To all whom it may concern:*

Be it known that I, JOHN A. ROST, of Axtell, in the county of Kearney and State of Nebraska, have invented a new and Improved Link Valve-Gear, of which the following is a full, clear, and exact description.

The invention relates to link-motions; and its object is to provide a new and improved link valve-gear for steam-engines and other machines and arranged to produce a complete center action by placing the eccentric and valve in a true line at all times, thereby preventing undue friction and pinching of the parts under heavy pressure.

The invention consists of novel features and parts and combinations of the same, as will be described hereinafter and pointed out in the claims.

Reference is to be had to the accompanying drawings, forming a part of this specification, in which similar characters of reference indicate corresponding parts in all the figures.

Figure 1 is a perspective view of the improvement. Fig. 2 is a sectional plan view of the same on the line 2 2 of Fig. 1, and Fig. 3 is a side elevation of one of the eccentric-rod heads.

The improved link valve-gear is provided with a yoke A, formed at its upper end with a pin B, adapted to be engaged by a shifting lever for moving the link A into either an uppermost or lowermost position, according to the desired position of the valve. On the side arms of the yoke A are arranged alined bearings C, engaged by trunnions D, having their plates D' secured by bolts E to the outer faces of link-arms F, arranged in pairs and fastened together at their lower and upper ends by cross-pieces F', F², secured in place by bolts F³, as will be readily understood by reference to the drawings. The link-arms F of each pair are spaced to form the usual segmental slots engaged by sectional boxes G, fitted to slide on the link-arms and engaged by a pin H', carried by the valve-stem H and secured in place by a set-screw H².

On the forward sides of the link-arms F and near the lower ends thereof are formed lugs F⁴, adapted to receive pivot-pins I I' for the heads J J', respectively, of the two eccentric-rods, giving the usual rocking motion to the links to actuate the stem H, and consequently the valve, in the usual manner.

Now it is evident that by the arrangement described the yoke A, besides being capable of turning, can be readily raised or lowered into the position shown in dotted lines in Fig. 1, so as to change the position of the valve as the boxes G slide in the link-arms F to change the position of the valve upon further rocking of the link-arms. By making the link in sections and providing liners any wear at the sectional boxes can be readily taken up, so that the device runs true at all times without cramping or pinching the parts and at the same time gives longer life to the gear. By having the link mounted to turn the several parts can readily adjust themselves and produce a complete center action to place the eccentric and valve in a true line at all times.

Having thus described my invention, I claim as new and desire to secure by Letters Patent—

1. A link valve-gear, provided with a yoke adapted to be raised or lowered, a link made in sections or parts fastened together, trunnions secured to the link and mounted to turn in bearings on the said yoke, and link-blocks fitted to slide in the link and connected with the valve-stem, substantially as shown and described.

2. A link valve-gear, provided with a yoke adapted to be raised or lowered, a link made in sections or parts fastened together, trunnions secured to the link and mounted to turn in bearings on the said yoke, link-blocks fitted to slide in the link and connected with the valve-stem, and lugs projecting from the link and adapted to receive the pivot-pins for the eccentric-rod heads, substantially as shown and described.

3. A link valve-gear, provided with a link comprising pairs of link-arms, and cross-bars for connecting the pairs of link-arms with each other and also the arms of each pair, substantially as shown and described.

4. A link valve-gear, provided with a link comprising pairs of link-arms, cross-bars for connecting the pairs of link-arms with each other and also the arms of each pair, and liners placed between the link-arms and the cross-pieces to take up wear, substantially as shown and described.

JOHN A. ROST.

Witnesses:
 A. G. WARREN,
 J. D. ENGLAND.